(12) United States Patent
Norden (10) Patent No.: US 7,746,872 B2
(45) Date of Patent: Jun. 29, 2010

(54) PACKET ROUTING AS A FUNCTION OF DIRECTION

(75) Inventor: Hahn Norden, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1750 days.

(21) Appl. No.: 10/850,672

(22) Filed: May 21, 2004

(65) Prior Publication Data

US 2005/0259665 A1 Nov. 24, 2005

(51) Int. Cl.
*H04L 12/56* (2006.01)
(52) U.S. Cl. .................. 370/396; 340/906; 370/352; 370/401; 370/412; 370/424; 398/47; 707/3; 709/238; 709/250; 712/15; 719/328
(58) Field of Classification Search .......... 370/389, 370/352, 218, 229, 230, 235, 254, 360, 388, 370/412, 466, 395.51, 396, 401, 424; 707/10, 707/3; 709/227, 252, 223, 238, 250; 711/110; 340/2.21, 906; 710/305; 714/43; 398/47; 712/15; 719/328

See application file for complete search history.

(56) References Cited

U.S. PATENT DOCUMENTS

| | | | | | |
|---|---|---|---|---|---|
| 4,621,362 | A | * | 11/1986 | Sy | 370/403 |
| 5,179,558 | A | | 1/1993 | Thacker et al. | 370/406 |
| 5,612,952 | A | * | 3/1997 | Motoyama | 370/412 |
| 5,852,407 | A | * | 12/1998 | Ishii et al. | 340/2.21 |
| 6,147,991 | A | * | 11/2000 | Rogers | 370/389 |
| 6,163,541 | A | * | 12/2000 | Casey et al. | 370/395.51 |
| 6,208,662 | B1 | * | 3/2001 | O'Neill et al. | 370/412 |
| 6,243,026 | B1 | * | 6/2001 | Jones et al. | 340/906 |
| 6,526,056 | B1 | | 2/2003 | Rekhter et al. | 370/392 |
| 6,578,105 | B2 | * | 6/2003 | Finn et al. | 711/110 |
| 6,601,217 | B1 | | 7/2003 | Smith | 714/822 |
| 6,621,820 | B1 | | 9/2003 | Williams et al. | 370/395.31 |
| 6,735,173 | B1 | * | 5/2004 | Lenoski et al. | 370/235 |
| 6,754,205 | B1 | * | 6/2004 | Sakaue | 370/360 |
| 6,865,155 | B1 | * | 3/2005 | Wong et al. | 370/235 |
| 6,895,531 | B2 | * | 5/2005 | Suzuki et al. | 714/43 |
| 6,920,135 | B1 | * | 7/2005 | Lea | 370/389 |
| 6,931,002 | B1 | * | 8/2005 | Simpkins et al. | 370/354 |
| 6,973,032 | B1 | * | 12/2005 | Casley et al. | 370/230 |
| 7,058,010 | B2 | * | 6/2006 | Chidambaran et al. | 370/218 |
| 7,133,955 | B2 | * | 11/2006 | Mayhew et al. | 710/305 |
| 7,161,945 | B1 | * | 1/2007 | Cummings | 370/401 |
| 7,221,676 | B2 | * | 5/2007 | Green et al. | 370/401 |
| 7,260,636 | B2 | * | 8/2007 | Blumenau et al. | 709/227 |
| 7,307,996 | B2 | * | 12/2007 | Forbes et al. | 370/401 |
| 7,310,319 | B2 | * | 12/2007 | Awsienko et al. | 370/254 |
| 7,310,688 | B1 | * | 12/2007 | Chin | 709/252 |
| 7,352,765 | B2 | * | 4/2008 | Dai et al. | 370/424 |
| 7,401,157 | B2 | * | 7/2008 | Costantino et al. | 709/238 |
| 7,509,657 | B2 | * | 3/2009 | Mehra et al. | 719/328 |
| 2001/0053157 | A1 | * | 12/2001 | Li | 370/466 |
| 2003/0033307 | A1 | * | 2/2003 | Davis et al. | 707/10 |
| 2003/0108352 | A1 | * | 6/2003 | Hellman | 398/47 |
| 2003/0154357 | A1 | * | 8/2003 | Master et al. | 712/15 |
| 2004/0095927 | A1 | * | 5/2004 | Chang et al. | 370/388 |

(Continued)

*Primary Examiner*—Gerald Gauthier (57) ABSTRACT

A direction of travel of a packet at a switch in an interconnection fabric that has multiple switches with ports is determined. A next turn pointer in the packet is used to identify turn bits in a routing path. The turn bits are then used to select an exit port as a function of the direction of travel of the packet.

31 Claims, 5 Drawing Sheets

U.S. PATENT DOCUMENTS

| | | | |
|---|---|---|---|
| 2004/0139236 A1* | 7/2004 | Mehra et al. | 709/250 |
| 2004/0151177 A1* | 8/2004 | Burton et al. | 370/389 |
| 2004/0151191 A1* | 8/2004 | Wu et al. | 370/401 |
| 2004/0213151 A1* | 10/2004 | Willhite et al. | 370/229 |
| 2004/0246991 A1* | 12/2004 | Tsuzuki et al. | 370/466 |
| 2005/0091358 A1* | 4/2005 | Mehra et al. | 709/223 |
| 2005/0171937 A1* | 8/2005 | Hughes et al. | 707/3 |
| 2005/0259665 A1* | 11/2005 | Norden | 370/396 |

* cited by examiner

PACKET ROUTING AS A FUNCTION OF DIRECTION

BACKGROUND

Packet routing algorithms fall into different categories. Destination routing is a method where a destination and a source of a packet are carried in a header of the packet. At each switch in the route, a next destination is looked up in a routing table. This is referred to as a turn in the path of the packet. This may result in high latency, or delay in transmission of the packet due to the frequent look-ups in the routing table. Another category of packet routing is referred to as path routing. Each turn taken by a packet is identified in the header of the packet in the form of a list. A pointer is used to separate turns already taken from turns yet to be taken.

Although path routing reduces latency by eliminating turn look-up at every switch, it may still not be optimized. Some path routing methods use a return path that is also stored in the header for error handling. In the event of an error, the source is notified, or a request is sent back to the source using the return path. For packets that are delivered without errors, additional bandwidth consumed to carry the return path is effectively wasted bandwidth, since the return path was not needed.

Some path routing methods do not include return paths. In the case of an error, an absence of an acknowledgment signal from the receiver, an ACK, triggers a resend after a certain amount of time.

A further alternative involves the use of a mathematical routing formula to encapsulate source information in destination information. This is described in a PCE Express Advanced Switching Specification. Calculations using the formula can result in long compute times.

DETAILED DESCRIPTION

In the following description, reference is made to the accompanying drawings that form a part hereof, and in which is shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the scope of the present invention. The following description is, therefore, not to be taken in a limited sense, and the scope of the present invention is defined by the appended claims.

The functions or algorithms described herein are implemented in software or a combination of software and human implemented procedures in one embodiment. The software comprises computer executable instructions stored on computer readable media such as memory or other types of storage devices. The term "computer readable media" is also used to represent carrier waves on which the software is transmitted. Further, such functions correspond to modules, which are software, hardware, firmware or any combination thereof. Multiple functions are performed in one or more modules as desired, and the embodiments described are merely examples. The software is executed on a digital signal processor, ASIC, microprocessor, or other type of processor operating on a computer system, such as a personal computer, switch, server or other computer system.

Some embodiments may implement the functions in two or more specific interconnected hardware modules with related control and data signals communicated between and through the modules, or as portions of an application-specific integrated circuit. Thus, the exemplary process flow is applicable to software, firmware, and hardware implementations.

Figure 1:
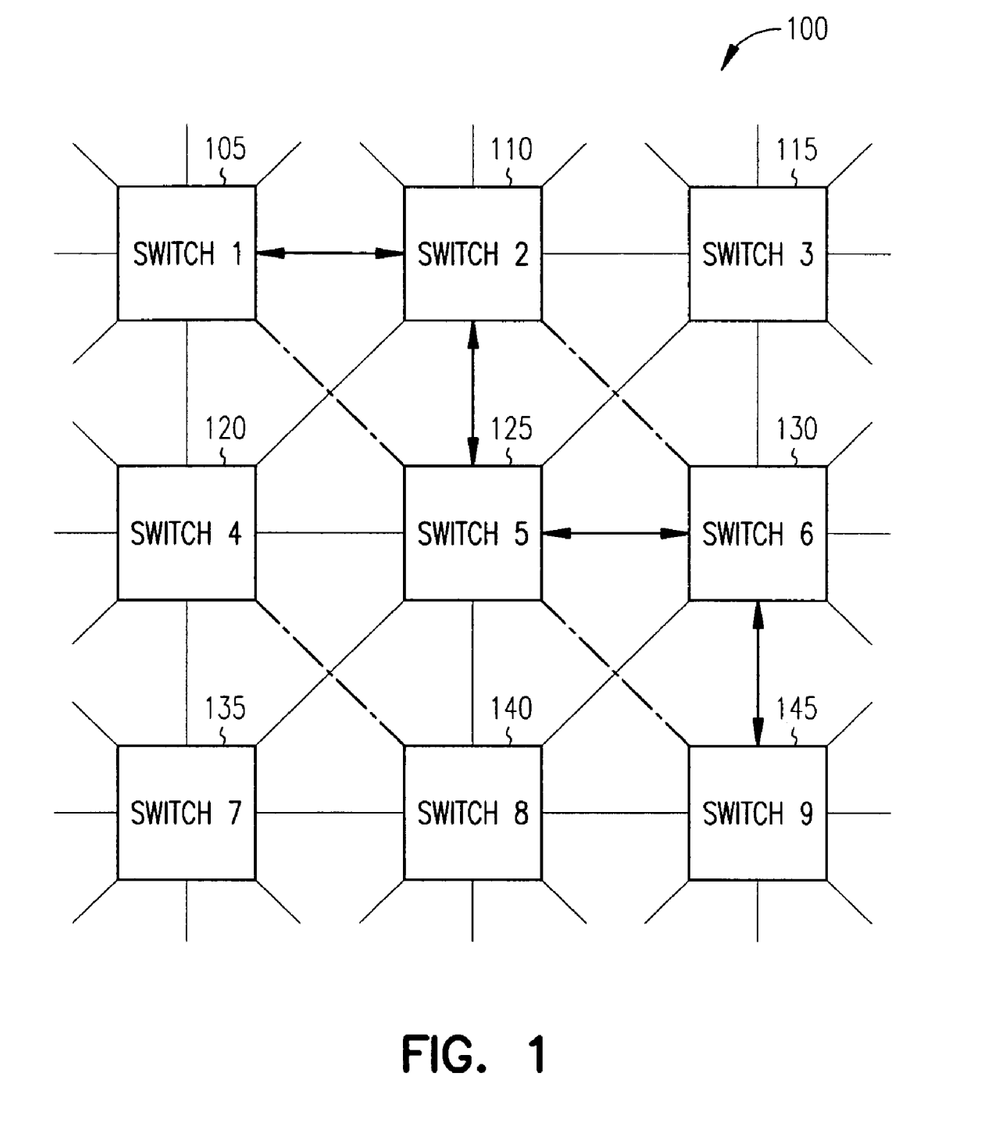
FIG. 1 is a block diagram of a nine switch fabric according to an example embodiment.

FIG. 1 is an example embodiment, of a nine switch fabric 100. Switches 1 through 9 are labeled, and identified by reference numbers 105, 110, 115, 120, 125, 130, 135, 140 and 145 respectively. Each switch in this embodiment has eight ports labeled 0 through 7 in FIG. 1. The number of ports may be varied significantly in different embodiments. The ports are labeled in a clockwise ascending order, with port 0 at the top, port 1 at the top right corner, port 2 at the middle right, port 3 at the bottom right, port 4 at the bottom middle, port 5 at the bottom left, port 6 at the middle left and port 7 at the top left. The term "switch" is used in this description to broadly encompass many different types of devices that are capable of receiving data via one or more inputs, and routing the data via one or more outputs. Such inputs and outputs may be real or virtual in various embodiments. Examples of such devices include switches, routers and other devices.

The switches are coupled to each other by the ports. A path is shown with double arrow lines between switch 1 at 105 through several switches to switch 9 at 145. The path may be described by indicating the ports at each switch that are connected. For instance, switch 1 at 105 uses port 2 to couple to port 6 of switch 2 at 110. Switch 2 at 110 is coupled through port 4 to port 0 of switch 5 at 125. Switch 5 at 125 is coupled via port 2 to port 6 of switch 6 at 130. Switch 6 at 130 is coupled via port 4 to port 0 of switch 9 at 145. The fabric may include many other connections as shown.

Figure 2:
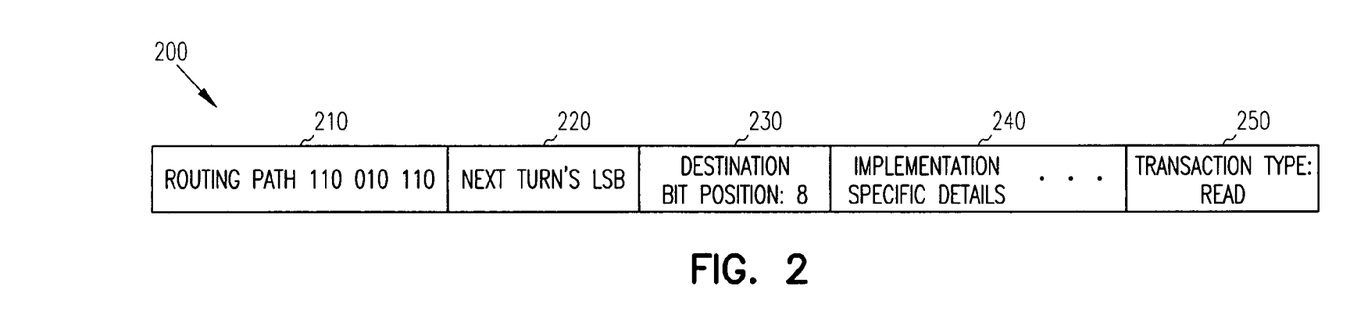
FIG. 2 is a header for a forward packet according to an example embodiment.

The fabric 100 is used to transport communications, such as packets between devices coupled to the fabric. Packets may be fixed length or variable length, or may be a continuous or discontinuous stream. The term "packet" is used to represent information, and is not limited to known formats. In one embodiment, the information is in a digital form, but may also be analog, or a combination of digital and analog in further embodiments. In one embodiment, a forward packet contains a header 200 as shown in FIG. 2. Header 200 comprises multiple fields in one embodiment. A routing path 210 is specified in one field. It may be the first field, and has a length sufficient to support a longest desired path length in one embodiment. Routing path 210 in this specific header 200 describes a path from switch 1 at 105 to switch 9 at 145.

The routing path has groups of three binary digits in this example, capable of specifying the locations of ports on a switch. Three digits are sufficient for an 8 port switch. From left to right, the digit bit positions are numbered 7 through 0 respectively. The left most group of digits is "110", corresponding to a turn of six clockwise ports. In other words, if a packet enters a switch at port 0, it would exit the switch 6 ports clockwise at port 6. The digits thus specify a clockwise distance of the exit port from the enter port for a forward going packet and may be referred to as routing turns.

Header 200 also has a next turn's least significant bit (LSB) 220, and a destination bit position pointer 230. The next turn's LSB 220 is a pointer to the least significant bit of the routing path where the routing turns bits begin for a switch. Destination bit position pointer 230 in this example is 8, corresponding to the number of bits that describe the routing path. In one example, it corresponds to three groups of routing path digits. The header 200 may also contain implementation specific details 240 or other information not used for the path identification, and may also contain a transaction type 250, such as a "Read" transaction from a host to a storage device coupled to fabric 100.

Figure 3:
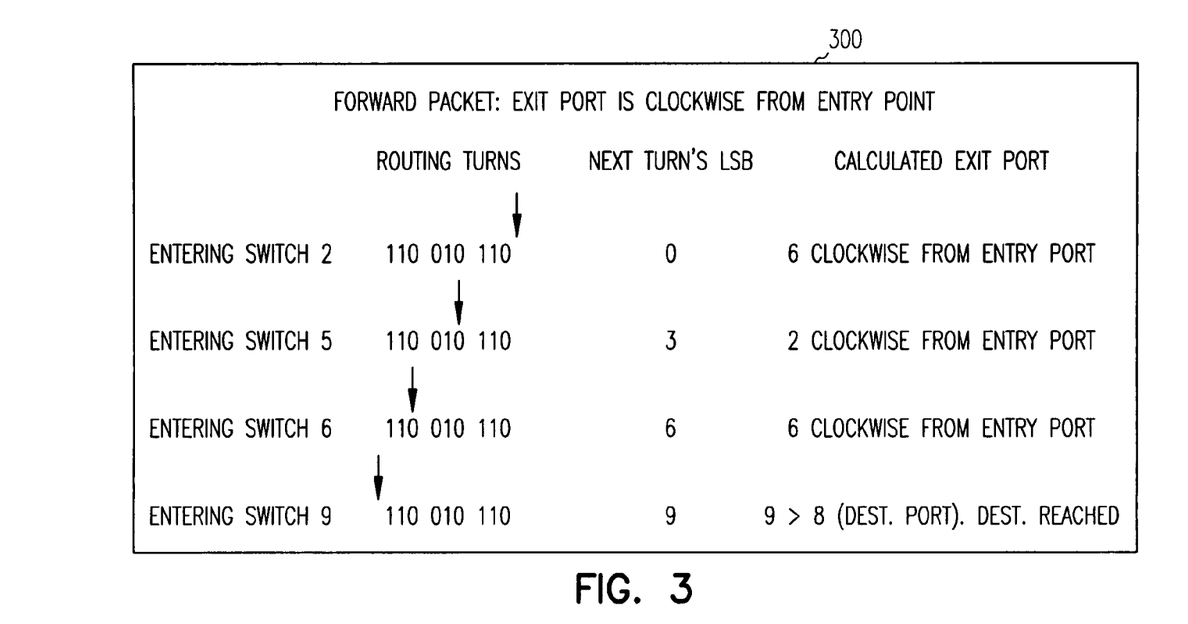
FIG. 3 is a forward route calculation table according to an example embodiment.

FIG. 3 is a table indicated generally at 300 that illustrates an example progression of a packet along the routing path specified in header 200. A packet originates at switch 1 at 105. Switch 1 at 105 looks up the path to switch 9 at 145 from a routing table. It obtains information to populate the header 200, routing path 210, destination bit position pointer 230 and next turn's LSB 220. Each row in the table corresponds to a packet entering a switch, and an arrow or pointer is used to identify the LSB of the next turn. Header 200 is appropriately populated with this information for this example. The packet is sent to switch 2 at 110 through output port 2 of switch 1 at 105 as indicated by the routing table. The packet containing the header is received at an input or enter port 6 of switch 2 at 110.

The next turn's LSB value at this point is 0, and the number of ports is 8. The three bits of the routing path, labeled routing turns in the table of FIG. 3, are "110"=six. This indicates a clockwise distance of the exit port from the enter port. The exit port for switch 2 at 110 is thus port 4. Since port 4 is coupled to port 0 of switch 5 at 125, the packet is forwarded to this switch, after the next turn's LSB field is incremented by 3, which is the LSB of the next turn to be taken at the next switch.

At switch 5 at 125, the LSB value is now 3, and since it also has 8 ports, the next three bits of the routing path, bits 5, 4 and 3, "010"=two, indicate a clockwise distance to the exit port. Thus, port 2 is the exit port. The LSB value is again incremented by 3, and the packet is sent to port 6 of switch 6 at 130 with a LSB value of 6. It should be noted that if a switch has fewer ports, such as only four ports, only 2 bits of the routing path are used, and the LSB would also be incremented by the number of bits used. For consistency, the same number of bits may be used for each switch, if desired.

Switch 6 at 130 notes the LSB value of 6, and uses bits 8, 7 and 6 of the routing path "110"=six to obtain the clockwise distance to the exit port from the enter port 6. This identifies the exit port as port 4, which is coupled to port 0 of switch 9 at 145. The LSB is incremented to 9. When switch 9 at 145 receives the packet, it checks the LSB, and finds that it is greater than the bit position number. This identifies switch 9 as the destination port.

Figure 4:
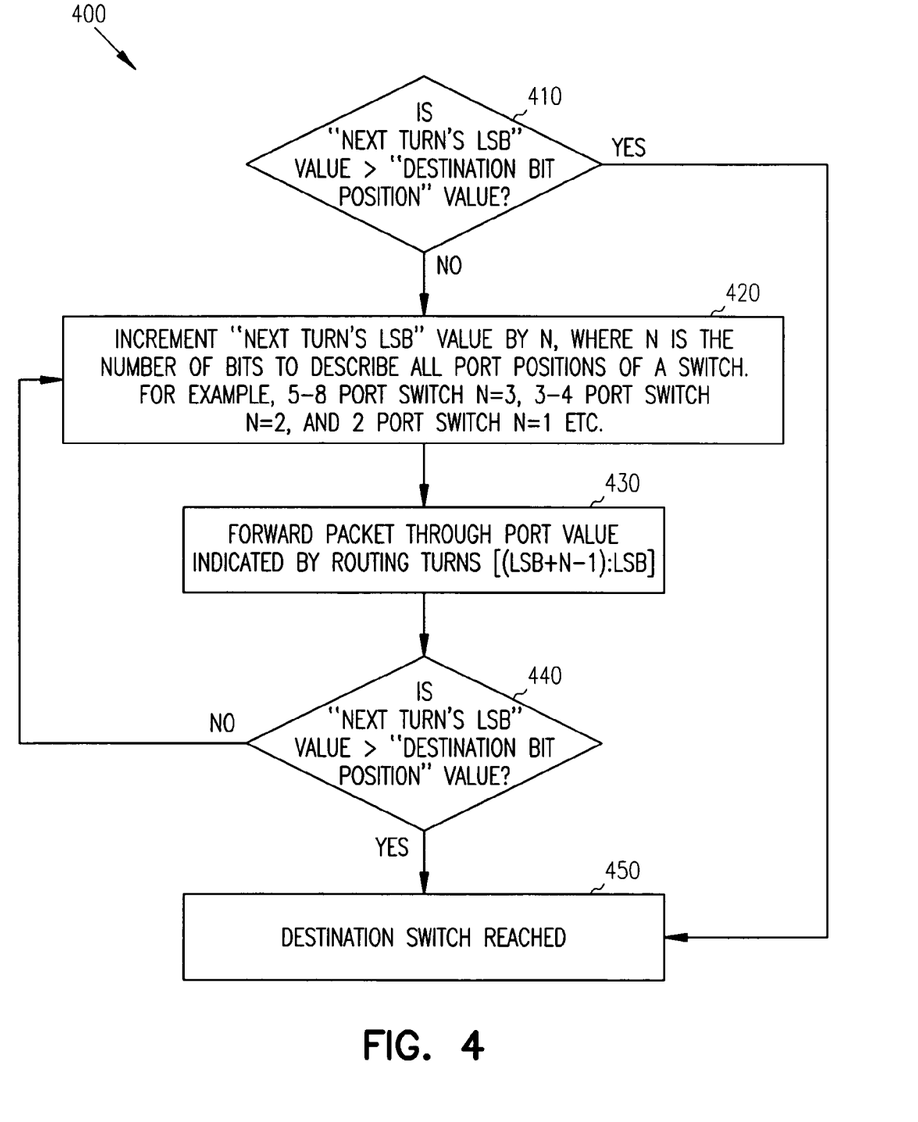
FIG. 4 is a flow chart illustrating handling of a forward packet at a switch in the switch fabric according to an example embodiment.

FIG. 4 is a flow chart of an example process 400 performed at a switch for a forward direction traveling packet. A packet is known to be traveling in the forward direction when the destination bit position pointer is larger than the next turn pointer. At 410, the switch determines if the next turn's LSB value is greater than the destination bit position value. If no, the destination switch has not been reached, and the next turn's LSB value is incremented by n, where n is the number of bits used to describe all port positions of a switch. For example, a switch with five to eight ports utilizes three bits to describe all its ports. A three to four port switch can describe its ports with 2 bits, and one bit may be used for a two port switch.

At 430, the packet is forwarded through the port having a value indicated by the routing turns. In one embodiment, this value is determined from the n bits identified by the LSB value, and is the number of ports that are clockwise from the port of entry of the packet. At 440, if the next turn's LSB value is not greater than the destination bit position value, processing returns to 420 for incrementing the LSB. If the value is greater than the destination bit position value, the destination has been reached, as indicated at 450. Note that decision block 410 may also result in a determination that the destination has been reached at 450.

In the event of an error, or reply being requested, the header may also be used to determine how to route a return packet to the sender. In the above example, assuming that an error occurred at switch 6 and was detected by switch 9, at 130, a return packet is sent from switch 9 at 145 to switch 1 at 105. A header for such a return packet is shown in block form at 500 in FIG. 5. The header is similar to that of header 200 for the forward packet.

Figure 5:
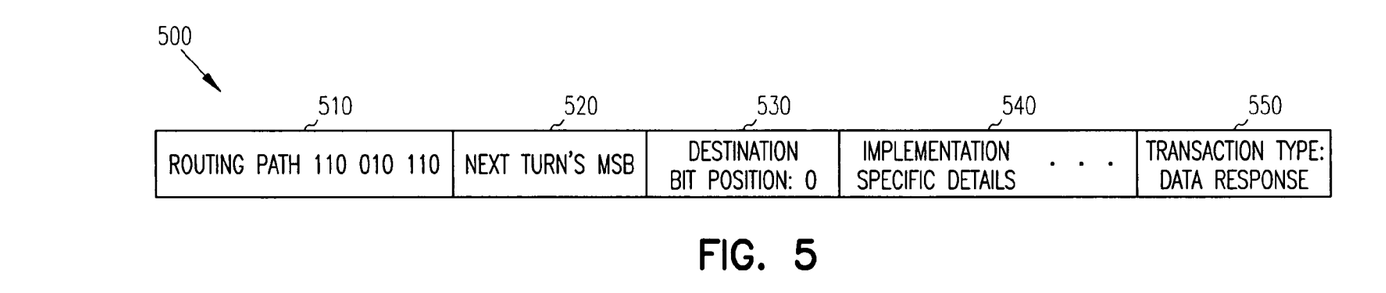
FIG. 5 is a header for a return packet according to an example embodiment.

Header 500 comprises multiple fields in one embodiment. A routing path 510 is specified in one field. It may be the first field, and has a length sufficient to support a longest desired path length in one embodiment. Routing path 510 in this specific header 500 describes a path from switch 1 at 105 to switch 9 at 145 when read in one direction, and a return path when read in a different direction.

The routing path has groups of three binary digits in this example, capable of specifying the locations of ports on a switch. Three digits are sufficient for an 8 port switch. From left to right, the digit bit positions are numbered 7 through 0 respectively. The left most group of digits is "110", corresponding to a turn of six counter-clockwise ports. In other words, if a packet enters a switch at port 6, it would exit the switch 6 ports counter-clockwise at port 0. The digits thus specify a counter-clockwise distance of the exit port from the enter port for a return packet.

Header 500 also has a next turn's most significant bit (MSB) 520, and a destination bit position pointer 230. Destination bit position pointer 530 in this example is 0, corresponding to the number of hops on the routing path, counting down from the original destination. In other words, it corresponds to three groups of routing path digits. The header 500 may also contain implementation specific details 540 or other information not used for the path identification, and may also contain a transaction type 550, such as a "Data response" transaction from a storage device to a host coupled to fabric 100.

Figure 6:
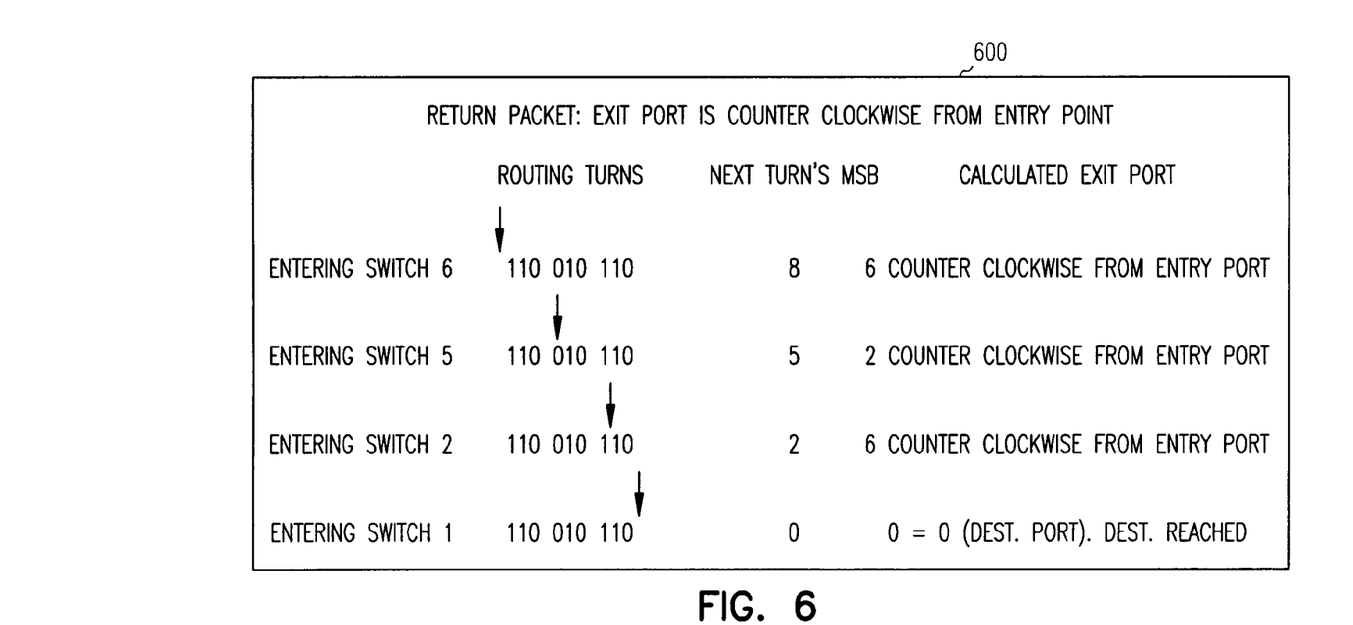
FIG. 6 is a return route calculation table according to an example embodiment.

FIG. 6 is a table indicated generally at 600 that illustrates an example progression of a packet along a return routing path specified in header 500. It is similar to the table for a forward packet. Among the differences, arrows in each row point to a most significant bit position (MSB). A packet is to be returned to switch 1 at 105 from switch 9 at 145. Switch 9 at 145 changes the packet header 200 of the received packet as indicated at header 500. The destination bit is changed to 0 from 8, and the next turn's LSB is used as the next turn's MSB, and is set to 8.

At switch 6, at 130, with the MSB value at 8, bits 8, 7 and 6 of the routing path indicate a counter-clockwise distance of the exit port from the enter port. The value is "110"=six, which results in a counter-clockwise rotation of six ports to exit port 6. Switch 6 at 130 decrements the value in the next turn's MSB by n or 3 to value 5, which is the MSB of the next turn to be taken at the next switch.

At Switch 5 at 125, the packet is received on port 2 with an MSB value of 5. Bits 5, 4 and 3 of the routing path indicate a counter-clockwise distance of "010" or two from the enter port 2, to an exit port 0. Switch 5 at 125 thus forwards the packet to switch 2 at 110 after decrementing the MSB to 2. The packet is received at port 4 of switch 2 at 110, and bits 2, 1 and 0 of the routing path specify six as the distance of counter-clockwise rotation to the exit port, which is port 6. The MSB is decremented to value −1, or 0 in this example, and the packet is sent via port 6 to port 2 of switch 1 at 105. Switch 1 compares the next turn's MSB value of 0 and the destination bit position value of 0, indicating that switch 1 at 105 is the packet's destination.

Figure 7:
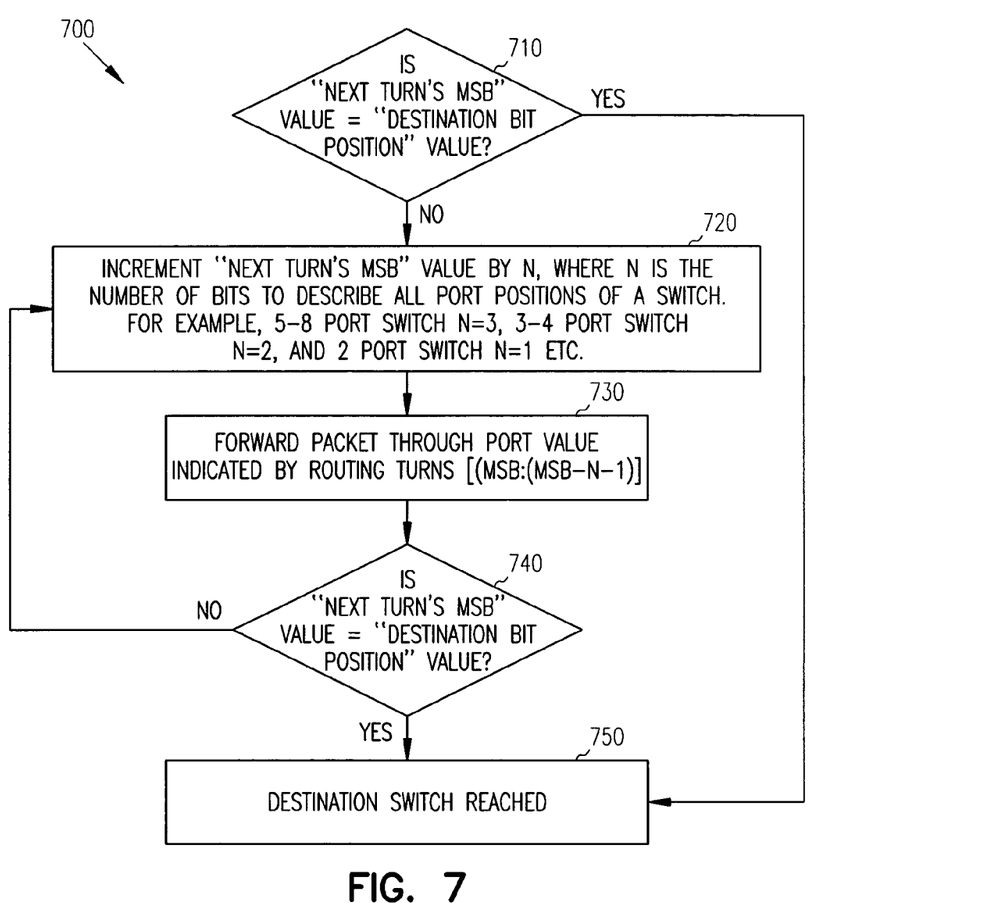
FIG. 7 is a flow chart illustrating handling of a return packet at a switch in the switch fabric according to an example embodiment.

FIG. 7 is a flow chart of an example process 700 performed at a switch for a backward direction, or return traveling packet. A packet is known to be traveling in the backward direction when the destination position pointer is less than or equal to the next turn pointer. At 710, the switch determines if the next turn's MSB value is equal to or less than the destination bit position value. If no, the destination switch has not been reached, and the next turn's MSB value is decremented by n, where n is the number of bits used to describe all port positions of a switch.

At 730, the packet is forwarded through the port having a value indicated by the routing turns. In one embodiment, this value is determined from the n bits identified by the MSB value, and is the number of ports that are counter-clockwise from the port of entry of the packet. At 740, if the next turn's MSB value is not equal to the destination bit position value, processing returns to 720 for decrementing the MSB. If the value is equal to or in some embodiments, equal to or less than the destination bit position value, the destination has been reached, as indicated at 750. Note that decision block 710 may also result in a determination that the destination has been reached at 750.

In one embodiment, the destination bit position is used to indicate when the destination is reached in both the forward and backward direction. The next turn field is a dual purpose field, indicating a LSB in the forward direction and a MSB in the return or backward direction. The packet is known to be traveling in the forward direction when the destination position pointer is larger than the next turn pointer. The packet is traveling in the backward direction when the destination pointer is less than or equal to the next turn pointer. The values in the routing path are used to describe the position of the exit port from the enter port at each switch in the path. In the forward direction, the values indicate the number of ports to turn in the clockwise direction, and in the backward direction, the values indicate the number of ports to turn in the counter-clockwise direction. Thus, the same path serves a dual routing function, by reversing the rotation between ports at each switch. In further embodiments, the rotation or turns may be counter-clockwise in the forward direction and clockwise in the reverse direction if desired.

Figure 8:
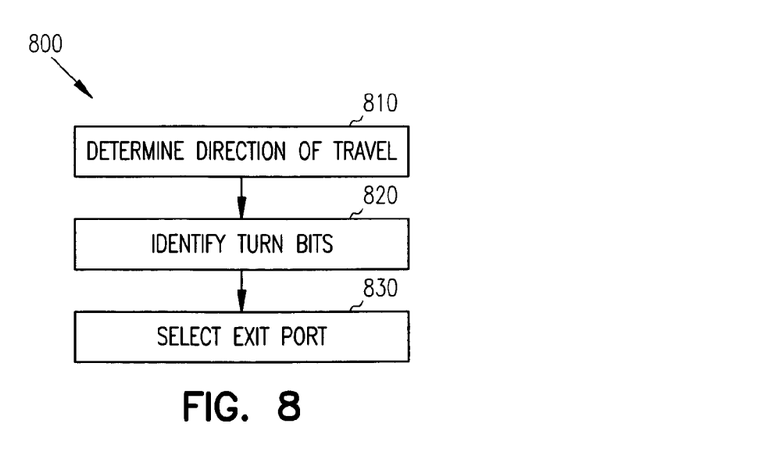
FIG. 8 is a flow chart illustrating handling of packets at a switch in the switch fabric according to an example embodiment.

FIG. 8 represents a method of routing a packet in the interconnection fabric generally at 800. At 810, a switch determines the direction of travel of a packet. A next turn's pointer in the packet is used to identify turn bits in a routing path at 820. The turn bits are then used to select an exit port as a function of the direction of travel of the packet at 830.

The invention claimed is:

1. A method comprising:
   determining the direction of travel of a packet at a switch in an interconnection fabric that has multiple switches with ports;
   identifying turn bits in a routing path as a function of a next turn pointer in the packet; and
   selecting an exit port as a function of the direction of travel of the packet using the turn bits.

2. The method of claim 1 wherein the turn bits indicate an amount of rotation between an enter port and the exit port of the switch.

3. The method of claim 2 wherein the direction of travel of the packet is used to determine a direction of rotation from the enter port.

4. The method of claim 1 and further comprising updating the next turn pointer to identify bits for routing path for use by a next switch.

5. The method of claim 4, wherein the next turn pointer is updated by incrementing it for a packet traveling in a forward direction and decrementing it for a packet traveling in a backward direction.

6. The method of claim 1 wherein the next turn pointer represents a least significant bit in a forward direction of travel, and a most significant bit in a backward direction of travel of the packet.

7. The method of claim 1 wherein the number of turn bits for a switch is a function of the number of ports of the switch.

8. The method of claim 1 wherein determining a direction of travel of the packet comprises comparing the next turn pointer to a destination pointer in the packet.

9. A method comprising:
   looking up a path for a packet from an origin switch to a destination switch in a switch fabric;
   creating a header for the packet having a routing path, a destination pointer and a next turn pointer;
   forwarding the packet to the next switch in the path; and
   at each successive switch in the path:
      updating the next turn pointer;
      determining a direction of travel of the packet; and
      forwarding the packet to the next switch based on the path, the next turn pointer and the destination pointer until the destination switch is reached.

10. The method of claim 9 and further comprising:
    changing the destination pointer from the destination switch to the origin switch;
    forwarding the packet to the previous switch in the path; and
    at each successive switch:
       updating the next turn pointer;
       determining a direction of travel of the packet; and
       forwarding the packet to the next switch based on the path, the next turn pointer and the destination pointer until the origin switch is reached.

11. The method of claim 10 wherein the next turn pointer identifies turn bits in the routing path that indicate an amount of rotation between an enter port and the exit port of a switch.

12. The method of claim 11 wherein the direction of travel of the packet is used to determine a direction of rotation from the enter port.

13. The method of claim 12, wherein the next turn pointer is updated by incrementing it for a packet traveling in a forward direction and decrementing it for a packet traveling in a backward direction.

14. The method of claim 10 wherein the next turn pointer represents a least significant bit in a forward direction of travel, and a most significant bit in a backward direction of travel of the packet.

15. A method comprising:
- at a switch in a switch fabric that has multiple switches with ports, determining the direction of travel of a packet;
- identifying turn bits in a routing path using a next turn pointer in the packet; and
- calculating an exit port as a function of the direction of travel of the packet using the turn bits, wherein the turn bits represent a clockwise distance of the exit port from an enter port when the packet is traveling in a first direction, and a counter-clockwise distance of the exit port form the enter port when the packet is traveling in a second direction in the switch fabric.

16. The method of claim 15 and further comprising determining a direction for the packet as a function of a destination pointer.

17. The method of claim 16 wherein the direction of the packet is in a forward direction when the destination pointer is larger than the next turn pointer.

18. The method of claim 17 wherein the packet has arrived at a destination switch when the next turn pointer is larger than the destination pointer.

19. The method of claim 16 wherein the direction of the packet is in a backward direction when the destination pointer is less than the next turn pointer.

20. The method of claim 19 wherein the packet has arrived at a destination switch when the next turn pointer is equal to the destination pointer.

21. A switch comprising:
- a processor having a computer readable medium with executable instructions stored thereon for causing the processor to implement a method comprising:
- determining the direction of travel of a packet at the switch in an interconnection fabric that has multiple switches with ports;
- identifying turn bits in a routing path as a function of a next turn pointer in the packet; and
- selecting an exit port as a function of the direction of travel of the packet and the turn bits.

22. The switch of claim 21 wherein the turn bits indicate an amount of rotation between an enter port and the exit port of the switch.

23. The switch of claim 22 wherein the direction of travel of the packet is used to determine a direction of rotation from the enter port.

24. The switch of claim 21 and further comprising updating the next turn pointer to identify bits for routing path for use by a next switch.

25. The switch of claim 24, wherein the next turn pointer is updated by incrementing it for a packet traveling in a forward direction and decrementing it for a packet traveling in a backward direction.

26. The switch of claim 21 wherein the next turn pointer represents a least significant bit in a forward direction of travel, and a most significant bit in a backward direction of travel of the packet.

27. The switch of claim 21 wherein the number of turn bits for a switch is a function of the number of ports of the switch.

28. A computer readable medium having a packet header stored thereon, the header comprising:
- a routing path identifying distances between an enter port and an exit port for switches in a switch fabric;
- a next turn pointer; and
- a destination bit pointer wherein a direction of travel of the packet is a function of the next turn pointer and destination bit pointer.

29. The computer readable medium of claim 28 wherein the next turn pointer identifies a set of turn bits in the routing path corresponding to the number of ports for a switch.

30. The computer readable medium of claim 29 wherein the direction of travel of the packet identifies a direction between the enter port and the exit port.

31. The computer readable medium of claim 28 wherein the next turn pointer identifies a least significant bit or a most significant bit of the routing path as a function of the direction of travel of the packet.

* * * * *